United States Patent Office

2,951,762
Patented Sept. 6, 1960

2,951,762

METHOD OF GELATINIZING RAW CEREALS WITH ENZYMES

Anthony L. Nugey, 1271 Pierpont St., Rahway, N.J.

No Drawing. Filed Apr. 24, 1957, Ser. No. 654,643

7 Claims. (Cl. 99—51)

The present invention relates to the manufacture of malt beverages, such as beer, ale, porter, stouts, Weiss-beer and the like, as disclosed in my prior co-pending application Serial No. 346, 807, filed April 3, 1953, which has matured into Patent No. 2,790,718, granted April 30, 1957.

In said application I describe a process and means for making malt beverages with unmalted raw cereal adjuncts in combination with malt, and/or malt and prepared cereals, solid sugars and syrups.

The commonly used unmalted raw cereal adjuncts are corn grits, rice, rice flour, corn meal, refined (pure cornstarch) grits and the like. While these are the most popular raw cereal adjuncts, any starch-bearing material may be used which requires boiling in cereal cookers, to render respective starches soluble.

I have discovered that starch-bearing materials such as manioc, cassava, potato, sago and wheat products are ideal raw cereal adjuncts.

Many advantages are gained by making malt beverages from raw cereal adjuncts conjointly with malt and/or malt with prepared cereals. Only a few advantages will be given, as for example—finished malt beverages have a natural paler color, which heretofore were produced with oxidizing chemicals; they are less satiating; possess greater stability; have more snap, and beery character, and are made economically.

Raw cereal adjuncts which replace part of the malt in malt beverages are commonly used in the proportion of from 25–50% of such raw cereal adjuncts to 75–50% of malt.

In order to use raw cereal adjuncts for making malt beverages, they must first be processed in the brewery by pre-cooking them in a separate vessel, often called a "rice tub," "mashing kettle," "converter" or "cereal cooker."

Where a brewery is not equipped with a separate vessel as described above, the pre-cooking operations are readily carried out in the brew kettle, and the solubilized raw cereal adjunct mash (pre-cooked in the brew kettle) is combined with that of the main malt mash which was separately processed in the mash tub from malt, and/or malt and prepared cereals. The solid sugars and syrups are always added, to the worts prior to the addition of hops, to build up wort extracts.

The general practice, prior to the present invention, was to mix raw cereal adjuncts with water, or a combination of raw cereal adjuncts with water together with 10 to 35% by weight of finely ground malt; under certain conditions, as disclosed below, raw cereal adjuncts, or a combination of them, are mixed with equal quantities of finely ground malt, and this cooker mash is progressively heated in the cooker to an elevated temperature under time intervals by any suitable means to burst the starch granules and convert them into soluble starchy-paste. This gelatinized starchy-paste is subsequently combined with the main malt mash separately processed in the mash tub or lauter tub, where all starches are saccharified and converted into readily fermentable sugars and slowly and/or non-fermentable dextrins by the diastatic enzymes introduced into the mash by the malt charged into the mash or lauter tub. The conversion is carried out under medium temperatures ranging from 150–158° Fahrenheit, and the malt beverage is thus finally produced.

The only purpose of putting finely ground malt into cereal cookers conjointly with the raw cereal adjuncts is to keep the starchy material in its liquid state in order to permit cooker boiling operations at high temperatures and thereby wholly gelatinize the soluble starch, rendering it suitable for saccharification and conversion as described above.

It should be pointed out that raw cereal adjuncts are devoid of enzymes (diastases and peptases) and without additions of finely ground malt in cereal cookers, no liquefaction of starches is possible, hence the cooker mash would thicken and increase in viscosity, from the effects of high cooking temperatures, making it impossible to stir, boil or gelatinize the starch.

Using a minimum quantity of finely ground malt in the cereal cooker, partially reduces the degree of malt-husk contamination, but this practice materially reduces the extract yields. Employing a larger quantity of finely ground malt in the cereal cooker conjointly with the raw cereal adjuncts will only slightly increase the extract yields, but greatly increases the degree of malt-husk contamination since cooker operations are conducted at 212–250 degrees Fahrenheit. The maximum extract yields obtained with the addition of ground malt in cereal cookers are 90% for refined grits, 77% for rice and 75% for corn grits. See column 6 hereof.

Insofar as starch liquefying enzymes are concerned, I have grouped these into five classifications; namely—(1) cereal enzymes present in malt and malted cereals (2) bacterial enzymes produced by bacterial growth, (3) fungal enzymes derived from molds, (4) animal enzymes extracted from warm-blooded animals, and (5) plant enzymes isolated from natural plants.

According to scientific studies, starch consists of two types of molecules. One being an unbranched and the other a branched polymer of glucose. The unbranched molecules are designated as amylose fractions, and the fractions containing branched molecules are designated as amylopectin components. Some starches do not contain amylose fractions due to cross-pollination, and consequently do not particularly yield to liquefaction by cereal (amylolytic) enzymes derived from malts.

Some raw cereal adjunct starches begin to gelatinize at about 130 degrees Fahrenheit, others require temperatures up to and above 190 degrees Fahrenheit before they have been effectively gelatinized and yield free-flowing, non-viscous starch slurries. To accomplish effective gelatinization, regardless of the chemical structures and physical characteristics of various raw cereal adjunct starches, heat-stable enzymes of bacterial and fungal origin, or combinations of them, have been found useful in the present invention, due to their strong starch liquefying activity and stability at high temperatures. Unless all starchy material has been liberated from the starch granules and effectively gelatinized, substantial quantities of extract will be lost. For it is well-known that amylolytic enzymes present in malt and introduced into the mash tub and lauter tub mashes will not attack insoluble and ungelatinized starch. Other disadvantages resulting from such starch includes greatly impeded wort-runoff because of the gelling character and adhesiveness, fermenting yeast becomes contaminated with starches, and finished beverages will be too difficult to filter and clarify.

If malt is omitted from cereal cookers where raw cereal adjuncts are being heated within the temperature range of 130-190 degrees Fahrenheit, the starchy material of raw cereal adjuncts thicken into a very viscous paste, making it impossible to continue further heating, or to operate the cereal cooker mixing agitator. Under this condition this viscous starch paste cannot be handled, neither can it be removed as it adheres tenaciously to the interior cooker walls and thereby becomes a total loss insofar as further use for making malt beverages is concerned.

Depending on source and variety of barleys used in making malt for brewing purposes, commercial malts have a protein content ranging from 8% to about 14%, and the diastatic value ranges from 28 to approximately 160 degrees Lintner. The peptic powers are correlated with the protein content; malt low in protein will have low enzymic activity, and vice-versa. When malts are improperly modified and/or incorrectly kiln dried by malting establishments the enzymic activity may be diminished to the extent that the malt will be incapable of liquefying its own starch, and incapable of peptonizing its own proteins.

When ground malt is added into the cooker for the specific purpose of liquefying and gelatinizing raw cereal adjuncts, the cooker mash must be kept at the peptonization temperature (100-122 degrees Fahrenheit) for a period of not less than 60 minutes, but preferably 75 minutes. In carrying out the peptonization operation, the temperature must not exceed 122 degrees Fahrenheit otherwise the malt's peptic enzymes will be inactivated. Inactivation speedily occurs as the mash temperature of 156 degrees Fahrenheit is approached. Similarly, the malt's diastatic enzymes are destroyed as the mash temperature approaches 175 degrees Fahrenheit, which is considerably below the gelatinization points of some raw cereal adjunct starches.

When indicating thermometers are inaccurately calibrated, or uniformly register the true mash temperatures the factor of safety for above mentioned malt enzymes is diminished; therefore, the inactivated enzymes will not have sufficient power to carry out adequate peptonization, nor will gelatinization of all starchy material be satisfactorily completed.

Early break-down of malt beverages, as evidenced by haziness and formation of dusty-precipitates, is the result of attempting to carry out cooker malt peptonization too hastily (between 10 and 30 minutes). When malt proteins are adequately peptonized they are degraded into proteoses, peptones, amino-acids and other intermediate fractions. The first two fractions serve as foam-forming ingredients in the malt beverages; whereas a portion of the peptones and aminoacids are utilized by the yeast, necessary for its nitrogenous nutrition.

Improperly peptonized malt proteins are the principal cause for the development of beer-hazes, and remain unreacted upon when the cooker mash is let down into the mash tub or lauter tub, thereby considerable loss in proteins occurs due to their rejection with spent grains emanating from either the mash tub or lauter tub.

After liquefaction and gelatinization has been completed, the cooker mash is boiled for periods of 10 to 60 minutes, depending on which raw cereal adjuncts are used and upon their degree of granulation. After the boiling period has been completed the cooker mash is let down and combined with the mash tub or lauter tub mash. When ground malt is used in the cereal cooker conjointly with raw cereal adjuncts, the total cooking time ranges from 150 to 165 minutes.

Depending upon which type of barley is used in making malt, the malt-husks (straw) normally range from 8 to 12% by weight. These malt-husks (straw) are not a part of the malt kernel, but belong to the refuse foliage of the barley plant. Their sole purpose is to provide sacks which retain starches and enzymes within the malt kernel.

Malt-husks have the same chemical composition as ordinary straw. They contain color pigments ranging from yellow to tints of blues, purples, browns and blacks. These color pigments are produced by soil conditions and are intensified through malting procedures. Besides the color pigments, the malt husks also contain tannins, resinous matter and chemical buffers. Chemical analyses disclose that malts also contain from 2 to 3% of fatty liquids which possess bitter and unpleasant taste. The higher the malt kiln temperatures are maintained, the greater amount of melanoidins are formed and these substances have positive properties to darken malt beverages.

Using raw cereal adjuncts conjointly with malt and/or malt and prepared cereals in the proportions previously stated, is the accepted practice for brewing paler malt beverages; and, such brews have a longer shelf-life than brews made from all malt. Factually, this is wholly ignored when malt is used in cookers to gelatinize raw cereal adjuncts, for these reasons color pigments are released from the malt husks which darken the finished malt beverages; the tannins impart harsh and acrid flavors; resinous matter accounts for some of the objectionable tastes; the viscous fatty liquids leached out of the malt further increases bad odors; and in general lasting bitterness which clings to the tongue results, and strawy flavors are evident. Pressure cooking or overcooking at atmospheric temperatures, or the decomposition of gelled viscous starchy-paste intensifies above stated contamination. Buffers released from cooker malt makes it difficult to accurately control brewing procedures on account of variable pH values. These high cooking temperatures also decompose some of the malt protein fractions thereby further affecting taste, flavor and stability. And finally, more heat energy and electric power is consumed because of a longer total cooking period as disclosed herein.

In order to reduce off-tastes, and bad odors and to eliminate strawy-flavors, it has been suggested that a minimum amount of cooker malt should be used in the cookers with the raw cereal adjuncts. The minimum recommended was 10% of ground malt and 90% of raw cereal adjuncts, by weight. This defeats the purpose because a great deal of extract is lost due to the fact that all of the raw cereal adjunct starch has not been solubilized while undergoing gelatinization and the other troublesome problems described above remain unsolved.

I have discovered that worts made with dehusked malt conjointly with raw cereal adjuncts produced a resultant cooker mash and subsequently finished beer which was not too intensely darkened or too badly contaminated. On the other hand I discovered that complete gelatinization or the difficulties due to improperly peptonized dehusked malt proteins were not satisfactorily solved. And in addition, the cost of de-husking the cooker malt further increased the cost of beer production.

I have now discovered that worts made from raw cereal adjuncts and gelatinized with heat-stable, odorless and soluble enzymic preparations yielded very brilliant beers with shelf-life beyond 12 months. These finished beers are paler, flavors are milder, tastes extremely pleasant and the finest ethereal aroma was present. A comparison of finished beers made with cooker malt gelatinized raw cereal adjuncts as compared to raw cereal adjuncts gelatinized with heat-stable, odorless and soluble enzymic preparations are shown herewith.

| Physical Properties of Malt Beverages | No. 1 | No. 2 | No. 3 | No. 4 | No. 5 | No. 6 |
|---|---|---|---|---|---|---|
| Original Gravity. B. | 11.18 | 11.60 | 12.00 | 11.81 | 11.82 | 11.88 |
| Color Deg. Lovibond | 3.85 | 4.20 | 5.25 | 2.50 | 2.10 | 2.00 |
| Percent Proteins | 0.39 | 0.36 | 0.40 | 0.36 | 0.26 | 0.35 |
| Tastes and Flavors | Grainy tastes, Sulfidic odors, and Strawy flavors | | | Clean tastes, Aromatic odors, and No Strawy flavors | | |

Beer samples No. 1, 2 and 3 were produced from raw cereal adjuncts gelatinized with ground malts. These beers had a dark color ranging from 3.85 to 5.25 degrees Lovibond. They possessed grainy tastes, sulfidic odors and definite strawy flavors. There was also present a predominating after-bitterness.

Beer samples Nos. 4, 5, and 6, were produced from the same raw cereal adjuncts and were gelatinized with heat-stable, odorless and soluble enzymic preparations. These beers had a lighter color ranging from 2.00 to 2.50 degrees Lovibond. Their tastes were clean, aromatic and without strawy flavors. There was no after-bitterness discernible.

The object of this invention is to provide a product and process which substantially accelerates brewing operations by using any available raw cereal adjunct; these are more efficiently gelatinized without contamination by means of heat-stable, odorless, and soluble enzymes. This results in economy of making malt beverages together with definite quality improvement thereof.

Another object is to omit malt from cooker mashes heretofore used to gelatinize raw cereal adjuncts.

Another object is to omit malted raw cereals from cooker mashes.

A further object is to replace all malt and/or malted raw cereals in the cooker mashes with heat-stable, odorless and soluble enzymic preparations, thereby avoiding cooker mash contamination with decomposition products released by malts and malt-husks.

A further object is to make maltless cooker mashes exclusively from raw cereal adjuncts with heat-stable, odorless and soluble enzymic preparations which possess very strong starch liquefying activity so that very small quantities will adequately and efficiently gelatinize large quantities of raw cereal adjuncts.

A still further object is to produce maltless raw cereal cooker mashes thereby preventing introduction of unpeptonized malt and cereal proteins into the finished beers which effect their shelf-like and continued clarity, by gelatinizing raw cereal adjuncts with heat-stable, odorless and soluble, high potency enzymic preparations, as complete replacement for ground malt.

Of the five classifications of starch liquefying enzymes mentioned herein, well suited for my purpose are the heat-stable, odorless and soluble high potency enzymes derived from cultured strains resulting from the growth of bacteria belonging to B. Subtilis or B. Mesentericus groups, and/or combinations of both, which are sources of extremely heat-resistant, high potency amylolytic (starch liquefying) and proteolytic (protein splitting) enzymes.

Also suited for my purpose are high potency and heat-stable, odorless and soluble enzymes obtained from thermophylic bacteria which are capable of starch liquefaction and proteolysis at high temperatures.

Further suited for my purpose are the high potency and heat-stable, odorless and soluble fungal (amylases) enzymes capable of starch liquefaction.

Also suited for my purpose are high temperature enzymes of bacterial origin high in starch liquefaction (amylases) activity which thrive at high temperatures.

Also suited for my purpose are heat-stable, odorless and soluble fungal and bacterial enzymes capable of amylolytic and proteolytic activities.

By heat stable, or heat resistant, I mean all bacterial and fungal amylases and proteases having high amylolytic and proteolytic activities capable of thriving in temperatures up to 205 degrees Fahrenheit, with a working range between 100 and 205 degrees Fahrenheit.

By high potency, I mean all bacterial and fungal amylases and proteases which are characterized by their strong starch liquefying properties and their stability at relatively high temperatures. Suitable for this invention are those amylases which have a liquefying action on starches of between 4,000 and 20,000 S-K-B units per gram at the hydrogen-ion concentration between 4.5 and 7 pH, with operating temperatures from 100 degrees Fahrenheit to the gelatinization points of raw cereal adjunct starches, up to and above 190 degrees Fahrenheit.

Various procedures are employed for measuring enzymic liquefaction of starches, but I have found the modification procedure developed by Sandstedt, Kneen and Blish (abbreviated S-K-B) as the most reliable and in general use.

For starch liquefying activity, under conditions disclosed herein, the value of enzymic activity, when tested under conditions which exist in breweries, I may use 1 pound of 20,000 S-K-B bacterial or fungal enzymes (or mixtures thereof), or 4 pounds of 5,000 S-K-B bacterial or fungal enzymes (or mixtures thereof) to obtain the same enzymic equivalency.

Bacterial and fungal enzymic reactions produced by high potency heat-stable, odorless and soluble enzymes are accelerated as the mash temperature is increased without any inhibition, because these enzymes are of a unique strain from bacteria and molds which thrive at high temperatures. When reactions are carried out in the presence of calcium-ions, phosphates and potassium and sodium salts, the liquefying power of these enzymes is materially increased, and stabilization effects against deterioration are assured.

Cooker mashing operations must be conducted to insure maximum extract yields from the raw cereal adjuncts used. The general practice is to use cleaned malt, which is finely ground, conjointly with raw cereal adjuncts. When malt is omitted from the raw cereal cooker and is replaced with high potency heat-stable, odorless and soluble enzymes the extract yields are materially increased. This is indicated as follows:

| Raw Cereal Adjuncts Per 100 Lbs. Batch | Extract Yields Obtained in Pounds | |
|---|---|---|
| | When Finely Ground Malt is Used in Cereal Cooker | When Heat-Stable, High Potency Enzymes are used in Cereal Cooker |
| Corn Grits (coarse) | 75 | 76½–77 |
| Refined (Cornstarch) Grits | 90 | 92 –94 |
| Rice [1] (Whole kernels) | 77 | 82–84½ |

[1] When whole rice is gelatinized with cooker malt, it is necessary to grind the rice. This is not required when heat-stable, high potency odorless and soluble enzymes are used in the cooker, since these enzymes attack the rice kernels very efficiently.

In the preferred method of practicing my invention, raw cereal adjuncts (such as corn grits, rice products, or refined pure cornstarch) grits, or mixtures thereof, are mashed in the cereal cooker with sufficient warm water. To compensate for mash water evaporated during the boiling period, I use 1 to 1½ barrels (31 U.S. gals. per barrel) of warm water to each 100 pounds of the raw cereal adjuncts. The optimum pH value of the mash water is 6.0–6.5.

As disclosed in my prior co-pending application, Serial No. 346,807 a slurry is made up of the proper quantity of heat-stable, odorless and soluble, high potency enzymes with a small quantity of warm water which is added into the raw cereal contained in the cereal cooker, or the enzymes are added into the cereal cooker mash in their dry-powdered form; the cooker mash is then heated until the enzymic reaction has been initiated.

The temperature "come up time" is about 5 to 10 minutes from the warm water temperature, to about 150–167 degrees Fahrenheit; then a rest period of 10 to 30 minutes is provided; the cooker mash temperature is then raised in 5 to 15 minutes from 150–167 degrees Fahrenheit to the boiling temperature of 212 degrees Fahrenheit (or higher when a pressure cooker is employed); and this mash is then boiled for a period of 20 to 30 minutes. At the conclusion of this final cycle, the starchy material has been wholly and completely gelatinized and made soluble.

When raw cereal adjuncts are gelatinized with ground malt the total cooking time is approximately 150 to 165 minutes, and longer, depending upon the chemical structure and certain physical characteristics of starches undergoing gelatinization, and time consumed in peptonizing this cooker malt.

When raw cereal adjuncts are gelatinized with heat-stable, odorless and soluble enzymes of mold and bacterial origin, or a combination of these, the total cooking time for refined grits (pure cornstarch) is about 75–85 minutes; for corn grits and rice products, the total cooking time is from 90–100 minutes. These enzymes liquefy the starches rapidly, irrespective of their physical characteristics or chemical structure, and make them amenable to the action of conversion enzymes that are present in the mash tub and/or lauter tub. A higher cooker temperature means a faster reaction rate on raw cereal starches even when small quantities of heat-stable odorless and soluble enzymes are used.

The cooker mash consistency resulting from gelatinizing raw cereal adjuncts with heat-stable, odorless and soluble enzymes, remains thin and non-viscous throughout the whole boiling period, it does not adhere to cooker interior surfaces, has a clean and aromatic odor, with pleasant taste, and is free from strawy-flavors. These highly sought benefits and economy of producing malt beverages are never obtainable when raw cereal adjuncts are gelatinized with cooker malt, because bacterial and fungal amylases thrive at high temperatures and are many times more potent as malt where starch liquefaction is concerned.

Raw cereal adjuncts' gelatinization is accomplished by concentrated heat-stable, odorless and soluble enzymes in the amount ranging between 10 and 100 grams for each 100 pounds of raw cereal adjuncts, added in the cooker in the form of a slurry, or dry-form. I have discovered that when such concentrated enzymes are diluted by pre-admixing them with stabilizers, activators, buffers and organic substances, these heat-stable, odorless and soluble enzymes are made more viable, retain their potency and decomposition will not occur.

For the present invention, the stabilizers, activators, buffers and organic substances such as sodium chloride, calcium sulfate, de-sodium and mon-sodium phosphates, potassium phosphate, dextrins and synthetic polysaccharide products and the like are being employed. The organic substances, namely dextrins and synthetic polysaccharide products are effective moisture dehydrators; moisture is present in the concentrated heat-stable, odorless and soluble enzymes, within the range of 3 to 18%. Moisture definitely accelerates enzymic activity since it is capable of catalyzing the initial reaction, and when not inhibited, results in the decomposition of the enzymes, which progressively destroys the enzymes and yields foul odors.

I now show specific examples which are illustrative of this invention, for making the diluted enzyme compounds:

| Stabilizers, Activators, Buffers and Organic Substances | Parts by Weight | | | |
| --- | --- | --- | --- | --- |
| | No. 1 | No. 2 | No. 3 | No. 4 |
| Heat-stable, Odorless and Soluble bacterial and fungal enzymes | 3–4 | 8–12 | 8–4½ | 3–7 |
| Sodium Chloride, NaCl | 46–50 | 50–57 | 40–17½ | 54–41 |
| Calcium Sulfate, CaSO$_4$.2H$_2$O | 35–30 | 30–10 | 30–21½ | 31–36 |
| Di-Sodium Phosphate, Na$_2$HPO$_4$ | 12–10 | 10–15 | | 10–12 |
| Mono-Sodium Phosphate, NaH$_2$PO$_4$ | 4–6 | 2–6 | | 2–4 |
| Potassium Phosphate, K$_2$HPO$_4$ | | | 1–½ | |
| Dextrins, and/or Synthetic Polysaccharide Products | | | 21–56 | |
| | 100 | 100 | 100 | 100 |
| Quantity of Enzyme-Compound Req'd per each 100 lbs. Raw Cereal Adjuncts, In Ounces | 16 | 4 | 6½ | 9½ |

The above specific examples of enzyme-compounds have liquefying activities in S-K-B units per gram as follows: No. 1 ranges from 450 to 550; No. 2 ranges from 1200 to 1600; No. 3 ranges from 600 to 800; and No. 4 ranges from 500 to 650. As shown above the quantity of these enzyme-compounds required to properly gelatinize and solubilize each 100 pounds of raw cereal adjuncts range between 4 ounces and 16 ounces.

Having described my invention what I believe to be new is:

1. The method of producing a mash for use in making beer which consists in mingling starch-bearing raw cereal from a group consisting of, manioc, cassava, potato, sago, wheat products, and mixtures thereof, in heated water, and adding a quantity of heat-stable, soluble, high potency enzymes, then gradually raising the temperature of the mass to a range of 212 to 250 degrees Fahrenheit boiling the mass at said temperature for a period of 20 to 30 minutes, to cause the starchy material in the cereal to be wholly gelatinized and liquefied, and mingling the entire mass with a main malt mash for conversion of the starch material into sugars and dextrins to finish the beer.

2. The method according to claim 1 wherein the proportions of cereal and enzymes are substantially 4 to 16 ounces of enzymes to 100 lbs. of cereal.

3. The method according to claim 1 wherein the proportions of cereal and water are substantially 100 lbs. of cereal to 1½ barrels of water.

4. The method of producing a mash for use in making beer which consists in mingling starch-bearing raw cereal from a group consisting of, manioc, cassava, potato, sago, wheat products, and mixtures thereof, in heated water, and adding a quantity of heat-stable, soluble, high potency enzymes next gradually raising the temperature of the mass to a range of temperature of 212 to 250 degrees Fahrenheit boiling the mass for a period of 20 to 30 minutes to cause the starchy material in the cereal to be wholly gelatinized and liquified, and mingling the entire mass with a main malt mash for conversion of the starch material into sugars and dextrins to finish the beer.

5. The method according to claim 1 wherein said enzymes have liquefying activity of not less than 400 to 1650 S-K-B units per gram.

6. The method according to claim 1 wherein the proportions of enzymes and cereal are substantially 4 to 16 ounces of enzymes to 100 lbs. of cereal and the enzymes have a liquefying activity of not less than 400 to 1650 S-K-B units per gram.

7. The method of producing a mash for use in making beer which consists in mingling starch-bearing raw cereal from a group consisting of manioc, cassava, potato, sago, wheat products, and mixtures thereof, with heated water and a quantity of heat-stable soluble high potency enzymes; cooking the mass below boiling temperature for an interval of 75 to 100 minutes, stopping the cooking stage for an interval of 10 to 30 minutes, next gradually raising the temperature of the mass to a range of 212 to 250 degrees Fahrenheit and boiling at said temperature for a period of 20 to 30 minutes, to cause the starchy material in the cereal to be wholly gelatinized and liquified; and then mingling the entire mass with the main malt mash for conversion of the starchy material into sugars and dextrins to finish the beer.

References Cited in the file of this patent

UNITED STATES PATENTS

| | | |
|---|---|---|
| 2,153,445 | Willaman et al. | Apr. 4, 1939 |
| 2,442,806 | Gluek | June 8, 1948 |
| 2,790,718 | Nugey | Apr. 30, 1957 |